UNITED STATES PATENT OFFICE.

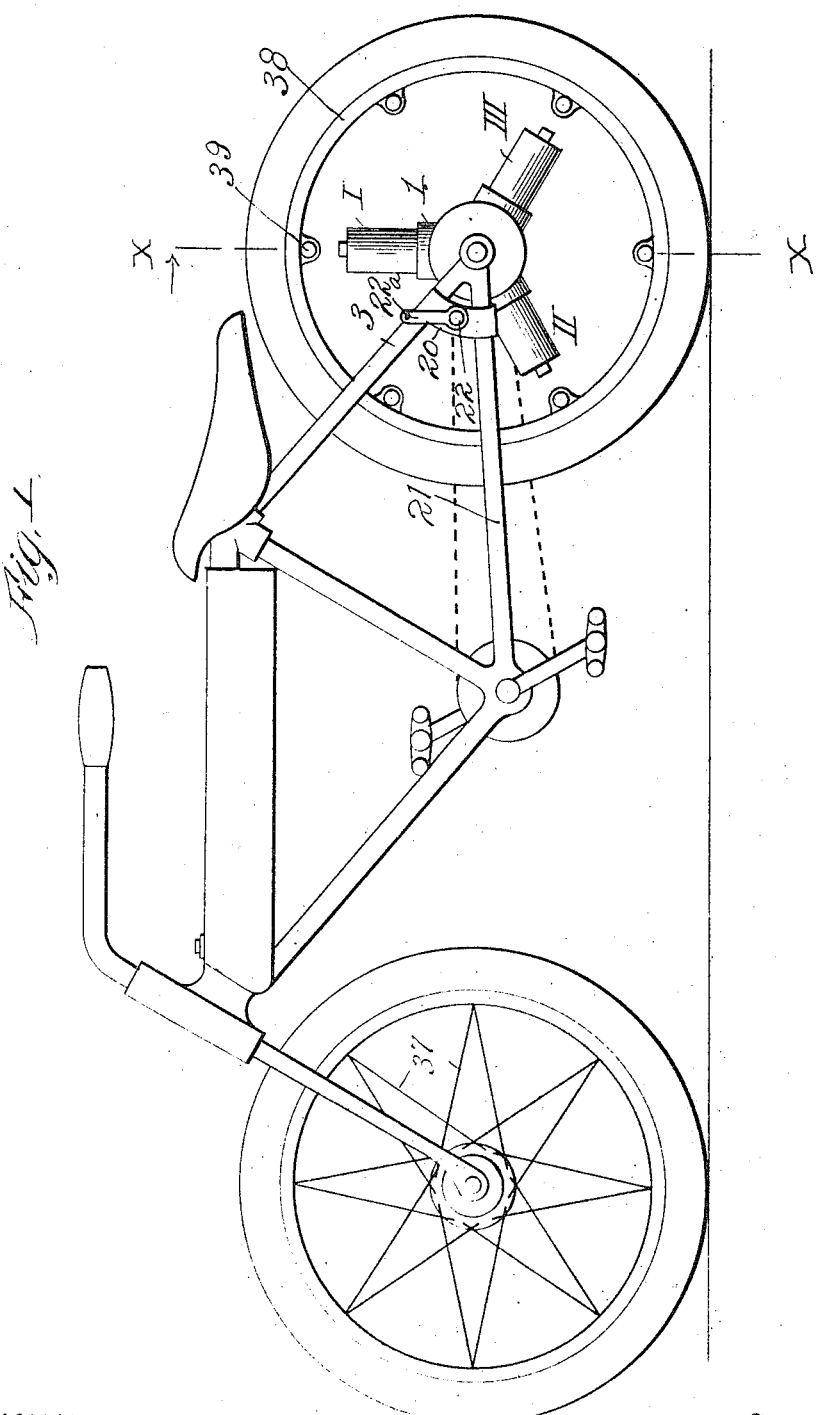

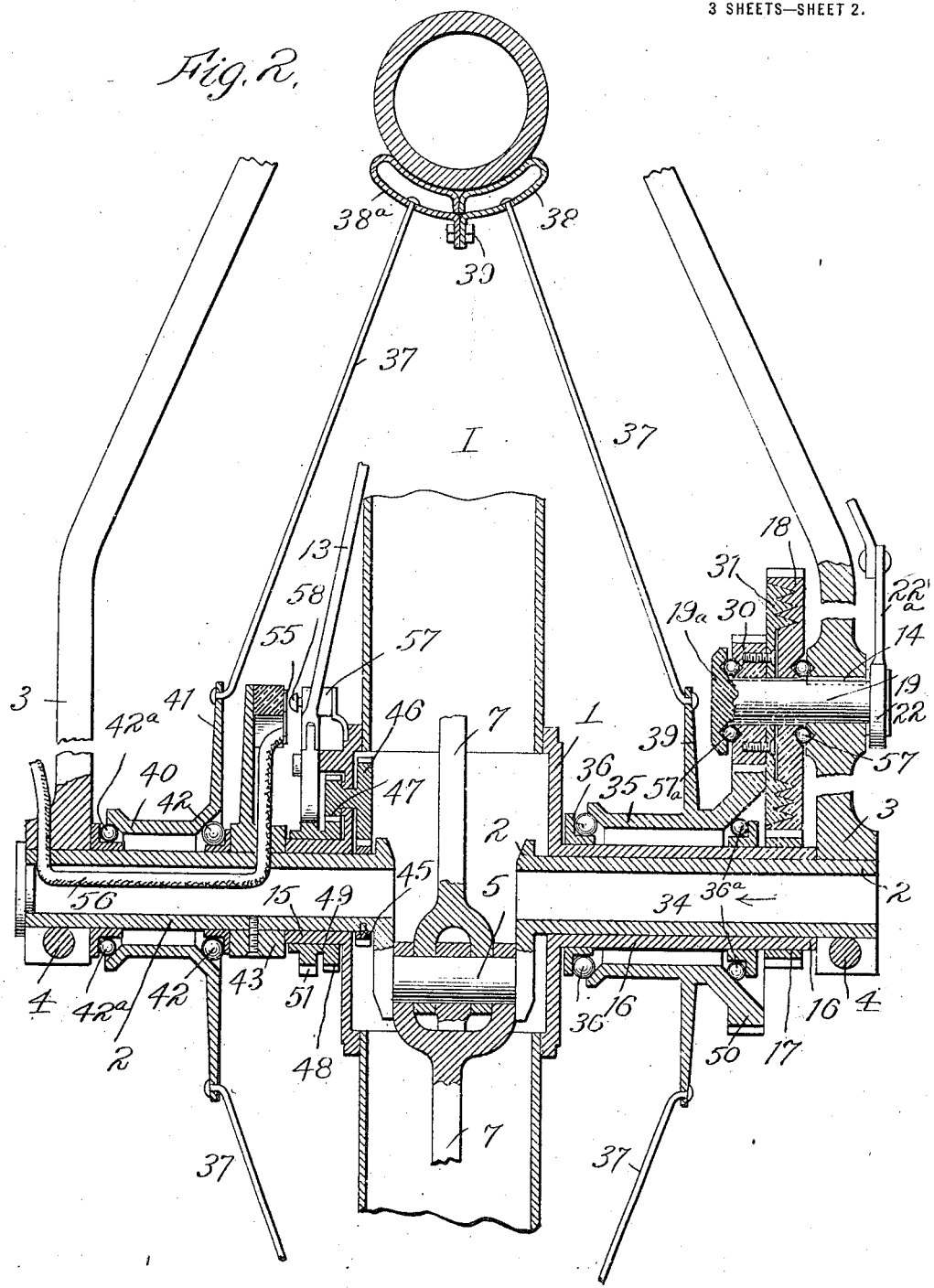

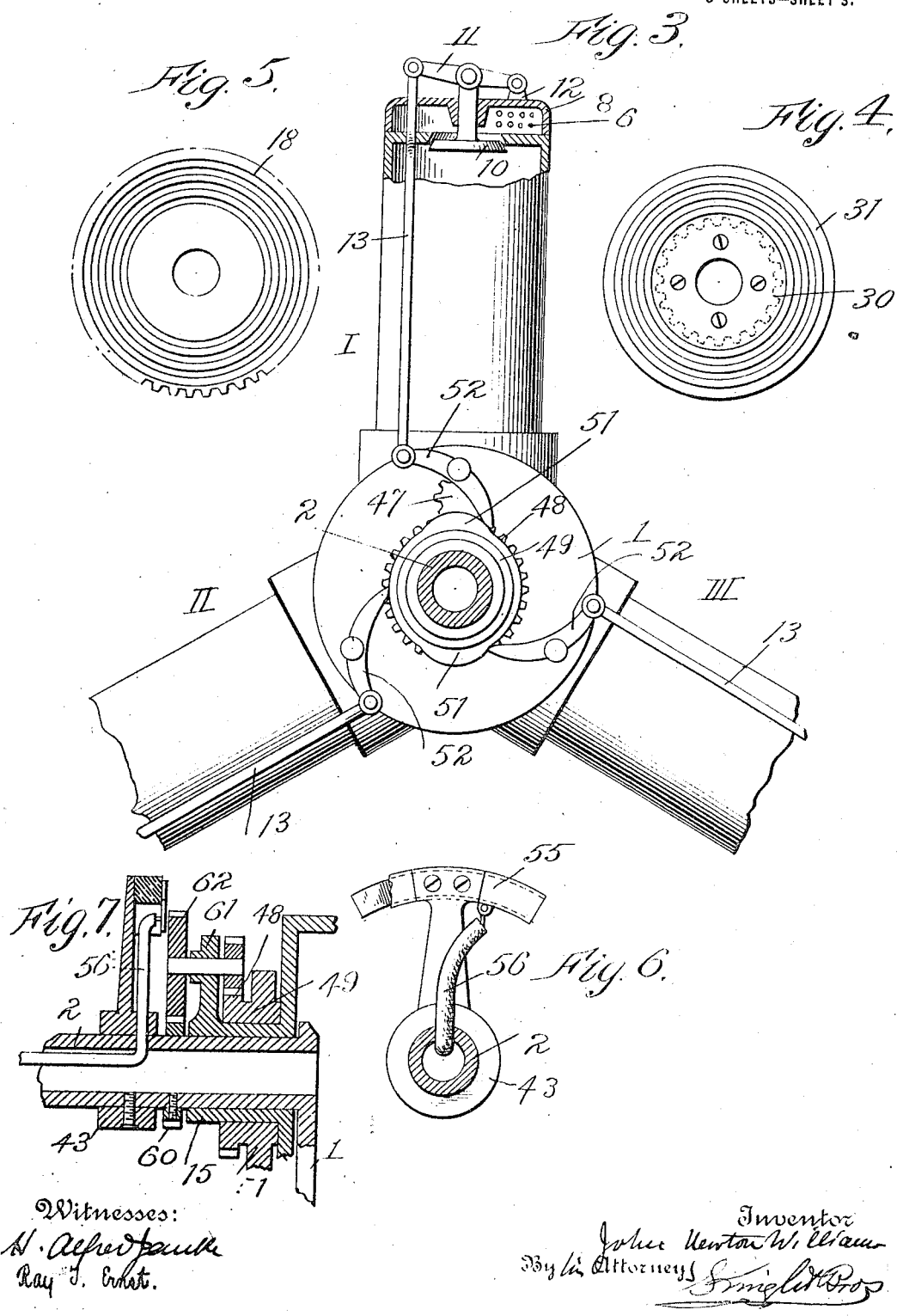

JOHN NEWTON WILLIAMS, OF DERBY, CONNECTICUT.

MOTOR-CYCLE.

1,139,616.

Specification of Letters Patent.

Patented May 18, 1915.

Application filed July 24, 1912, Serial No. 711,267. Renewed November 28, 1913. Serial No. 803,599.

*To all whom it may concern:*

Be it known that I, JOHN NEWTON WILLIAMS, a citizen of the United States, and residing at Derby, in the county of New Haven and State of Connecticut, have invented certain new and useful Improvements in Motor-Cycles, of which the following is a full and clear specification, illustrated by the accompanying drawings, the novel features of the invention being more fully pointed out in the annexed claims.

My invention relates in general to motor cycles in which the motor is disposed within one of its wheels, and in particular to motor cycles or similar vehicles in which a hydrocarbon engine of the rotary cylinder type is employed, the novel features of my invention being the particular arrangement of the rotary engine within one of the wheels of the cycle and the practical and novel arrangement of the coöperating elements which afford a reliable operation of the motor.

My improvements also relate to means by which the wheel and the motor may be conveniently taken apart and reassembled.

I have shown in the accompanying drawings, as an example, a motor bicycle, but it is obvious that this invention is not limited to vehicles of this character, having only two wheels.

The motor cycle illustrated is in its general outlines of the conventional form, all the well known detail features characteristic of these vehicles being therefore omitted in the drawings as well known and not relating to my invention.

In these drawings, Figure 1 represents a side elevation of such motor bicycle of conventional form; Fig. 2 is a portion of a vertical transverse section through the rear wheel of the motor cycle on the line X—X in Fig. 1, seen in the direction of the arrows; Fig. 3 is a side elevation of the motor in larger scale and it represents the side of the motor opposite to that shown in Fig. 1; Figs. 4 and 5 are face views of the clutch which will be described in detail hereafter; Fig. 6 is a detail view of the timer sector; Fig. 7 is a longitudinal vertical section of a portion of the motor similar to that shown in Fig. 2, showing a modification of the cam gearing, which controls the exhaust valves.

Referring to Fig. 1 it will be noted the motor is mounted within the rear wheel of the cycle, but the rear wheel is chosen merely as an example and I do not wish to hereby limit the arrangement of the motor in the rear wheel, as it may be mounted, if desirable, within the front wheel to the same advantage. As already mentioned the motor is of the so-called rotary cylinder type and I have shown as a convenient form a motor with three cylinders I, II, III, Fig. 1, set at an angle of 120° to each other in the casing 1, though of course any number of cylinders may be employed in this modern type of engine.

I shall now describe the detail arrangement of this motor within the rear wheel and I hereby refer in particular to Fig. 2, which represents a vertical transverse section through the upper cylinder I of the motor and through the adjoining elements. In this figure 2 represents the crank shaft, which is mounted and suitably fixed in the forks 3—3 of the vehicle frame, which form the lateral supports of the wheel, as for instance by key bolts 4—4, so that it is prevented from revolving. On this shaft is rotatably mounted the crank casing 1, which is of sufficient size to house the crank 5, of the crank shaft. Crank casing 1 is provided with suitable openings at an angle of 120° to each other to receive the cylinders, as shown in Fig. 2, with reference to cylinder I. The cylinders may be fastened in the crank casing by any suitable means employed in this type of motor and I have omitted such detail features, as they do not relate to my invention.

The following description of the cylinder I refers also to the other two cylinders, all the elements being alike in all three cylinders. Only the connecting rod 7 of cylinder I is shown, its piston being omitted. It may be stated, however, that the piston is of that type in which, by means of a check valve disposed therein, gas passes from the crank casing during the intake stroke of the piston into the upper part of the cylinder. This expedient is known in the art and I have omitted its detail description herein. The gas is supplied to the interior of the crank casing through a central boring 34, provided in the crank shaft, leading from the outside from the carbureter (not shown) to the interior. In the top of the cylinder is disposed the exhaust valve 10, which opens inwardly and which is controlled by rocking lever 11, mounted on a boss 12, which is provided on the upper portion of the cylinder. This upper cylinder portion consists of a cap 8, suitably fastened to the main body of the cylinder and the outer wall of the cap is provided with a number of perforations 6, through which the exhaust gases escape directly outward into the open air, without coming in contact with the rubber tire. Rocking lever 11 is in turn operated by a valve rod 13, the control of which will be referred to hereinafter in detail. Crank casing 1 is journaled on the crank shaft shanks by means of bearing sleeves 15 and 16, corresponding to the left and right hand side respectively, in Fig. 2. From this figure it will be also noted that the right hand sleeve 16 extends over the whole length of the crank shaft on that side to the fork 3 of the frame. At the outer end of sleeve 16 is suitably fastened a pinion 17. Adjacent to pinion 17 is mounted in a bridge 20 (Fig. 1) which connects the two frame portions 3 and 21, a stud 19, which is splined in its seat, as shown at 14, so that it can slide longitudinally of its axis. Stud 19 is threaded at its outer end and carries a nut 22, with lever extension 22ᵃ so that by rocking this lever the stud 19 may be shifted to the left or right in its seat. The other end of stud 19 is shaped into a head 19ᵃ between which latter and bridge 20 two pinions are disposed, which may be coupled together or released from each other by the following arrangement. Pinion 18, which is in mesh with pinion 17, previously referred to is provided at its inner face with annular grooves as shown in Figs. 2 and 5, which coöperate with annular ridges of clutch member 31, so that the latter is enabled, when pressed toward pinion 18, to frictionally engage the latter. Clutch member 31 is suitably attached to pinion 30. As shown, I may interpose ball bearings 57 and 57ᵃ respectively, between pinion 18 and bridge 20 and pinion 30 and head 19ᵃ, respectively. Now it will be seen from the previous description when if lever 22ᵃ is rocked in such direction that stud 19 is shifted to the right the two clutch members are tightened and pinions 18 and 30 are coupled thereby, whereas when lever 22ᵃ is thrown in the other direction stud 19 is free to shift to the left, whereby the clutch is loosened and pinions 18 and 30 are free to move relatively to each other.

In Fig. 2 pinion 19, for clearness sake, has been shown as located in the line X—X, Fig. 1, whereas in reality it is located laterally thereof as may be seen from Fig. 1. Referring now again to Fig. 2, two sleeves 35 and 40 are provided on the right and left hand side of the crank case, respectively, which are mounted in ball bearings, as shown. Sleeve 35 is mounted on ball bearings 36 and 36ᵃ, which are located on sleeve 16, whereas sleeve 40 is mounted on ball bearings 42 and 42ᵃ, mounted between frame 3 and a collar 43, fixed on crank shaft 2. Sleeves 35 and 40 have flanges 39 and 41, respectively, to the periphery of which spokes 37 of the wheel are attached in conventional manner. These spokes are arranged to form a wheel of the suspension type, as shown in the front wheel in Fig. 1, the spokes being omitted in the rear wheel for clearness sake. In this type of wheel the tension of spokes necessary to produce rigidity causes a thrust of the spoke flanges toward the inside in axial direction, and in this particular case the ball bearings 36 and 42 take up this inward thrust of the spoke flanges. Sleeve 35 carries at its outer end pinion 50, which is in mesh with pinion 30, previously mentioned, so that thereby the connection between the motor and the wheel is completed when clutch 31 is thrown in as previously explained. From Fig. 2 it will be noted that the felly of the wheel is longitudinally divided into two portions 38 and 38ᵃ, each portion having spokes 37 of the spoke flange, located on that side connected to it. The two felly halves are bolted together as shown at 39 by a suitable number of bolts arranged around the periphery. By this arrangement I am enabled to remove the spoke flanges from the shaft with the spokes and the corresponding felly half attached to it without disturbing the tension adjustment of the spokes. It is necessary that some provision for removing the spoke flanges from the crank shaft be made in order to be able to remove the motor from the wheel. By employing a divided felly, as described, I maintain, as previously mentioned, the tension adjustment of the spokes, and thus avoid the tedious centering of the wheel when the wheel is reassembled.

I shall now describe the manner in which the exhaust valve rods 13 are controlled and suitably timed so as to open and close at the proper moment. On the left hand shank of crank shaft 2 and between the crank and the inner wall of casing 1, is fastened a pinion 45, which is in mesh with an idle pinion 46, journaled in casing 1. To pinion 46 is rigidly connected pinion 47, which is located at the outside of casing 1. This latter pinion is in mesh with a pinion 48 integral with a sleeve 49, mounted on sleeve 15, as shown. This latter sleeve, which is shown in Fig. 3 carries two cams 51, which serve to operate exhaust valve rods 13 of the cylinders in such manner that each cylinder exhausts when its head is at the bottom, it being assumed that by means of gear 17, 18, 30 and 50, which connect the wheel with the motor, the latter makes four revolutions to one of the wheel in the same direction. Valve rods 13, previously mentioned, are pivoted at their inner ends each to a lever 52, which in turn is pivotally attached to crank casing 1, the other end being operated by cams 51, as shown, so that thereby exhaust valves 10 of the cylinders are suitably operated in timed relation to the other elements of the motor.

In order to conduct an electric current to the cylinders for igniting the mixture compressed therein at the proper moment I have attached to collar 43, previously mentioned, an insulated segment 55, which is shown in Fig. 6 in detail, and which is connected to a source of electricity by means of cable 56, which passes through the interior of the crank shaft 2 to the outside, as shown. The crank casing 1 carries for each cylinder an insulated bracket 57, which carries a metallic contact element 58, which in turn contacts with segment 55 during the revolution of the motor at the proper time to conduct electric current to the spark plugs of the motor (not shown).

In order to show that the exhaust valve cams may also be operated in a different manner as previously described, I have shown in Fig. 7 how these cams 50 may also be operated from a pinion mounted on the crank shaft but outside of the crank casing. In this figure a pinion 60 is fixed on crank shaft 2 adjacent to collar 43 and between the latter and sleeve 15 of crank casing 1. Sleeve 15 carries rigidly attached to it a suitably mounted bracket 61, in which a double pinion is rotatably mounted, one of its members 62, being in mesh with pinion 60, and the other member 63 being in mesh with pinion 48 of sleeve 49, which carries cams 51, and which is mounted as shown in Fig. 2 on sleeve 15. The only difference so far as sleeve 49 is concerned is that in Fig. 7 it is mounted on sleeve 15 with the cams passing the crank casing 1, whereas in Fig. 2 it is mounted with the cams passing the outside.

What I claim is:

1. In combination, a motor vehicle wheel of the suspension type having lateral supports, a revolving cylinder motor, having a crank and a crank casing and being placed within and between the spokes of said wheel, and arranged to revolve independently thereof, and having suitable transmission between the motor and the wheel; of a divided hub having two separated and independent spoke-flanges, one on either side of said motor and concentric with its crank-shaft, a thrust bearing disposed on either side of the motor for holding apart said spoke flanges to maintain the tension of the spokes and the rigidity of the wheel.

2. A motor vehicle wheel of the suspension type, having lateral supports, a revolving cylinder motor having a crank and a crank casing, and being placed within and between the spokes of said wheel, and revolving independently thereof and having its crank fixed to the wheel supports, and serving as a fixed axle of the wheel, the crank casing of said motor having sleeves forming bearings upon said crank shaft, suitable transmission between the motor and the wheel to permit revolving at different speeds relating to each other, said wheel having a divided hub and a spoke flange on each division and thrust bearing for holding said flanges apart to preserve the tension of the spokes and the rigidity of the wheel.

3. In combination, a motor vehicle wheel of the suspension type, having lateral supports, a revolving cylinder motor having a crank and a crank casing, and being placed within and between the spokes of said wheel, and revolving independently thereof, suitable transmission between the motor and the wheel, a divided hub with two separated spoke flanges, one on either side of the motor and concentric with the crank shaft, said shaft being fixed to the wheel supports, and serving as the axle of the wheel, two separate thrust bearings for supporting and holding apart said spoke flanges, a fixed distributer arm mounted on the crank shaft between one of the spoke flanges and the motor and having on its outer end an insulated, metallic distributer, from which an insulated conducting wire passes into and through the crank shaft, and outward beyond the revolving wheel hub.

4. In combination, a motor cycle having a wheel with a divided hub, each hub half having a spoke flange, a valve controlled revolving cylinder motor, mounted between said hub halves and having its crank shaft fixed and serving as a support for said divided hub, a valve operating cam mounted revolubly on and concentrically with said crank shaft between the motor and one of said spoke flanges, thrust bearings for holding said hub halves apart and in place, and suitable transmission between the motor, said cam and said wheel to permit their revolving at different speeds relatively to each other.

5. In a motor cycle having a wheel of the suspension type, having lateral supports, the combination with a revolving cylinder motor having exhaust valve, a crank and a crank casing and being disposed within said wheel and having its crank shaft fixed and serving as an axle for the wheel, said wheel having a divided hub, each half provided with a spoke flange disposed on one side of the motor, thrust bearings for holding each half in place to maintain the tension of the spokes, a cam gear and intermediate gearing in mesh with said cam gear and operated by the relative motion between the crank case and the crank shaft, the cams on said gear adapted to operate the exhaust valves of said motor in timed relation to its revolution.

6. In a motor cycle having a wheel of the suspension type, having lateral supports, the combination with a revolving cylinder motor having exhaust valves, a crank and a crank casing, and being disposed within said wheel and having its crank shaft fixed and serving as an axle for the wheel, said wheel having a divided hub, each half provided with a spoke flange disposed on one side of the motor, thrust bearings for holding each half in place to maintain the tension of the spokes, a bearing connected rigidly with and eccentrically to the motor and having journaled therein a counter shaft, a gear wheel at both ends of said counter shaft, a gear wheel rigidly attached to said crank shaft and in mesh with one of said counter shaft gear wheels, a cam gear wheel mounted concentrically with and revolubly on said crank shaft between the crank case and the adjacent spoke flange and being in mesh with the other gear wheel of said counter shaft, the cams on said cam gear adapted to operate the exhaust valves of said motor in time relation to the revolution.

7. A motor vehicle wheel having a divided hub and a revolving cylinder motor placed between the hub portions, said motor having a fixed crank shaft serving simultaneously as the axle of said wheel, and said motor revolving faster than the wheel, an intermediate transmission gear between the motor and the wheel comprising a gear wheel fixed to the motor, a gear wheel fixed to one of the hub portions of the wheel and a stud disposed outside of the wheel and the motor, having two gear wheels immediately adjacent to each other and independently rotatable thereon, one of said wheels in mesh with said motor gear wheel, the other in mesh with said hub gear wheel and a clutch for directly connecting and disconnecting said immediate adjacent gear wheels.

8. A motor vehicle wheel, having a divided hub and a revolving cylinder motor placed between the hub portions, said motor having a fixed crank shaft serving simultaneously as the axle for said wheel, and said motor revolving faster than the wheel, an intermediate transmission gear between the motor and the wheel, comprising a gear wheel fixed to the motor, a gear wheel fixed to one of the hub portions of the wheel and a stud disposed outside of the wheel and the motor and having two gear wheels immediately adjacent to each other and independently rotatable thereon, one of said wheels in mesh with said motor gear wheel, the other in mesh with said hub gear wheel, said two stud gear wheels having corresponding cone shaped ridges and grooves, at their adjoining sides and means for axially shifting said gear wheels to press the ridges of one gear wheel into the grooves of the other gear wheel to couple the two gear wheels and connect the motor with the vehicle wheel.

9. A motor vehicle wheel, having a divided hub and a revolving cylinder motor placed between the hub portions, said motor having a fixed crank shaft serving simultaneously as the axle for said wheel, and said motor revolving faster than the wheel, an intermediate transmission gear between the motor and the wheel, comprising a gear wheel fixed to the motor, a gear wheel fixed to one of the hub portions of the wheel and a stud disposed outside of the wheel and the motor and having two gear wheels immediately adjacent to each other and independently rotatable thereon, one of said wheels in mesh with said motor gear wheel, the other in mesh with said hub gear wheel, said two stud gear wheels having corresponding cone shaped ridges and grooves at their adjoining sides and means for longitudinally shifting said stud to press the ridges of one gear wheel into the grooves of the other gear wheels to couple the two gear wheels and connect the motor with the vehicle wheel.

JOHN NEWTON WILLIAMS.

Witnesses:
M. ALFRED JAUBLE,
WM. A. COURTLAND.